(No Model.)
H. J. BUELL.
NUT LOCK.
No. 580,340. Patented Apr. 6, 1897.
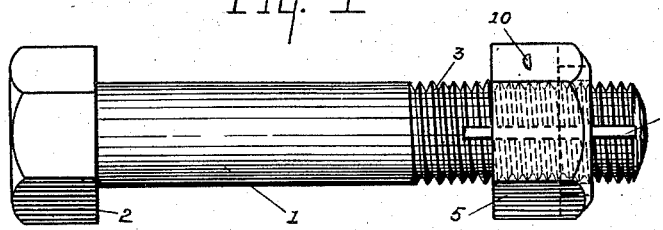
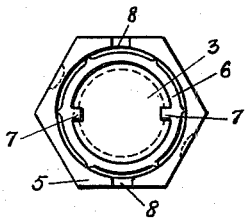
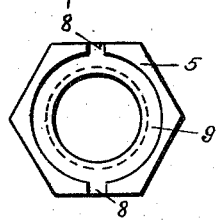
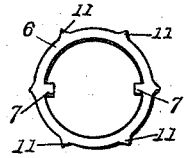
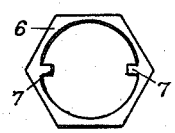
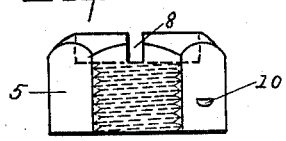
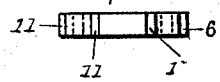
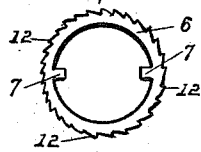
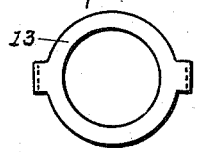
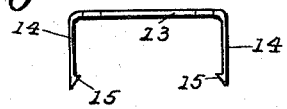
WITNESSES:
N. Webster Schlater
Alice M Bruguot.
Harry J. Buell INVENTOR
BY Chapin & Denny
his ATTORNEY.
THE NORRIS PETERS CO., PHOTO-LITHO., WASHINGTON, D. C.

UNITED STATES PATENT OFFICE.

HARRY J. BUELL, OF FORT WAYNE, INDIANA, ASSIGNOR TO LOUIS A. CENTLIVRE, OF SAME PLACE.

NUT-LOCK.

SPECIFICATION forming part of Letters Patent No. 580,340, dated April 6, 1897.

Application filed July 1, 1896. Serial No. 597,684. (No model.)

*To all whom it may concern:*

Be it known that I, HARRY J. BUELL, a citizen of the United States, residing at Fort Wayne, in the county of Allen, in the State of Indiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form part of this specification.

My invention relates to improvements in nut-locks.

The object of my invention is to provide a cheap, simple, and efficient nut-lock adapted to be readily and securely employed in all situations in which a threaded bolt and securing-nut are used, and is specially adapted for securing the fish-plates of railway-rails and for use in other positions in which the said bolt and nut are subjected to excessive vibration.

My invention comprises a threaded bolt having a proper retaining-head and provided upon its threaded end with a pair of diametrical longitudinal grooves or channels, a nut adapted to fit the said bolt and having a countersink or recess in the outer face thereof adapted to receive and contain a washer interlocking with said bolt, and also provided with diametric slots upon said face for the purpose of removing said washer, and an annular removable steel washer having upon its inner perimeter diametric radial tongues or flanges adapted to form an interlocking engagement with the said grooves of the bolt and whose outer perimeter is provided with a plurality of serrations adapted to form a binding friction upon the perimeter of said countersink to prevent rotation of said nut when in its locked position.

The novel feature of my invention consists in the construction and arrangement of the interlocking washer and containing-nut adapted for a frictional engagement therewith to prevent rotation thereof.

Similar reference-numerals indicate corresponding parts throughout the several views of the drawings.

Referring now to the drawings, Figure 1 is a side view of my improvement. Fig. 2 is an end view of the same, showing the washer interlocked with the channeled bolt and seated in the recessed nut. Fig. 3 is a plan view of the said nut, showing the recessed and slotted face thereof. Fig. 4 is a side view of the same, showing the screw-threaded bolt-hole in dotted outline. Fig. 5 is a detail of the steel washer, showing the interlocking flanges and the peripheral serrations. Fig. 6 is a side view of the same. Fig. 7 is a plan of a modified form of said washer adapted for use only in wood. Fig. 8 is another modified form of my improved washer. Fig. 9 is a plan view of a detachable spring-plate adapted for an interlocking engagement with said nut for additional security in situations where said nut is subjected to excessive vibration. Fig. 10 is a side view of the plate shown in Fig. 9.

The bolt 1, of any desired dimensions, has a proper integral head 2, preferably hexagonal, as shown, and has its opposite end provided with a screw-threaded portion 3, having one or more longitudinal peripheral grooves 4, preferably two diametric grooves, as shown in Fig. 2. The said grooves 4 preferably terminate at a distance from the inner end of said threaded portion equal to the thickness of the said nut less the depth of the recess therein, for the reason that they would be useless beyond that point and could only tend to weaken the bolt. These grooves 4 are adapted to receive corresponding transverse lugs or flanges upon the inner perimeter of the interlocking washer, hereinafter described. The nut 5 has a central screw-threaded bolt-opening and a circular countersink or recess 9, Fig. 3, upon its outer face, surrounding said bolt-opening and of a depth sufficient to contain the said washer. The said face of said nut is also provided with one or more, preferably two, diametric radial slots 8, of a depth equal to that of the said countersink, whereby the said washer may be gripped or seized for removal.

The annular washer 6, preferably of steel, may have a variety of forms, as shown in the drawings, the essential features of which are an interlocking with the bolt and a frictional engagement with the said nut. The preferred form of the said washer 6 is shown in Fig. 5, in which its inner perimeter has a pair of transverse tongues or flanges 7 coincident with the said grooves 4 of the said bolt and adapted to form an interlocking engagement therewith. The outer perimeter of said washer has a plurality of serrations 11, adapted to form a binding frictional contact with the circular perimeter of the said recess of said nut. It is obvious that a single interlocking flange 7 would form a locked engagement with said bolt and that the number of peripheral serrations 11 may be varied at pleasure. The outer perimeter of said washer 6 may be hexagonal, as shown in Fig. 7, or other angular form and adapted to fit a corresponding recess in said nut, though this form is obviously adapted for use only where the parts secured by said bolt are of wood or other material which is more or less compressible under pressure, whereby the said nut may be further rotated when in contact with the wood to make the sides of the hexagonal recess in said nut coincide with the hexagonal sides of said washer when the same is interlocked with the grooves of said bolt. Another modified form of said washer 6 is shown in Fig. 8, in which the outer perimeter is provided with a plurality of serrations 12, pointing in a direction opposite to that in which the said nut is adapted for rotation on said bolt when the said washer is in position thereon, the difference between the forms shown in Figs. 5 and 8 being simply in the number and arrangement of the peripheral serrations.

When my improved nut-lock is employed in situations in which there is excessive shaking or vibration thereof, having a tendency to displace said washer from its seat in the said nut, an additional security therefor is provided by means of the spring-metal plate or cap 13, having a central bolt-hole, and diametrically opposite vertical arms 14, provided with a hook or barb 15 upon the inner face of the free ends thereof, Fig. 10, adapted to engage corresponding recesses 10 in the opposite sides of said nut 5, Figs. 1 and 4.

The operation of my improvement thus described is obvious, and, briefly stated, is as follows: When the nut 5 has been placed in position on the bolt 1 and tightened thereon, the washer 6 is slipped over the threaded portion 3 with its tongues engaged with the grooves 4 of said bolt and is placed in position in the recessed face of said nut with its peripheral serrations in contact with and impinging upon the perimeter of said annular recess. As the said washer is thus interlocked with the bolt it will prevent rotation of the said nut when in use and even under severe vibration by the frictional contact of its serrated perimeter therewith. The said washer can readily be removed by lifting or prying it out of its seat in said recess, access thereto being afforded by the said slots 8.

The spring plate or cap 13 can readily be placed in position when desired and as readily be detached therefrom.

Having thus described my invention and manner of operating the same, what I desire to secure by Letters Patent is—

1. The combination with a screw-threaded bolt having one or more longitudinal grooves in the threaded portion thereof, of a nut 5 fitting said bolt and having a recess in the outer face thereof surrounding the bolt-opening and adapted to receive and secure a metallic washer, and provided with one or more radial slots 8 for the purpose specified, and an annular washer 6 having upon its inner perimeter one or more interlocking flanges 7 adapted to register with the said grooves of the bolt, and provided upon its outer perimeter with a plurality of serrations adapted to impinge upon the periphery of the recess of said nut, as described, and thereby prevent its rotation, and secure said washer therein by a binding friction therewith, substantially as described.

2. In a nut-lock the combination of a screw-threaded bolt having one or more longitudinal grooves in the threaded portion thereof; a nut fitting said bolt, recessed upon its outer face to form a seat for a fixed washer, and provided with one or more radial slots 8 for the purpose specified; a washer 6 having one or more ribs or flanges 7 adapted to form an interlocking engagement with said grooves and, provided upon its perimeter with a series of serrations adapted to prevent the rotation of said nut by forming a binding friction therewith as described; and a spring-plate 13 adapted to secure the said washer against displacement by an interlocking engagement with the said nut, all substantially as described.

Signed by me, at Fort Wayne, Allen county, State of Indiana, this 25th day of June, A. D. 1896.

HARRY J. BUELL.

Witnesses:
ALICE M. BENGNOT,
NEWTON D. DONYHMAN.